United States Patent
Hubis

(10) Patent No.: US 6,321,298 B1
(45) Date of Patent: Nov. 20, 2001

(54) FULL CACHE COHERENCY ACROSS MULTIPLE RAID CONTROLLERS

(75) Inventor: Walter A. Hubis, Louisville, CO (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/236,504

(22) Filed: Jan. 25, 1999

(51) Int. Cl.$^7$ .................................. G06F 12/08
(52) U.S. Cl. .................. 711/124; 711/113; 711/114; 711/120; 711/141
(58) Field of Search ................... 711/113, 114, 711/120, 124, 129, 141, 142, 143; 714/5, 6, 7

(56) References Cited

U.S. PATENT DOCUMENTS

| | | | |
|---|---|---|---|
| 5,586,291 | * 12/1996 | Lasker et al. ................ | 711/113 |
| 5,636,355 | 6/1997 | Ramakrishnan et al. ........ | 395/440 |
| 5,761,705 | 6/1998 | DeKoning et al. ............. | 711/113 |
| 5,974,506 | 10/1999 | Sicola et al. ................ | 711/120 |

OTHER PUBLICATIONS

Varma et al. "Destage algorithms for disk arrays with non-volatile caches" (U.C. Santa Cruz, Computer Engineering Dept. 1995, pp. 83–95).

* cited by examiner

*Primary Examiner*—Do Hyun Yoo
*Assistant Examiner*—Gary J. Portka
(74) *Attorney, Agent, or Firm*—Flehr Hohbach Test Albritton & Herbert LLP

(57) ABSTRACT

A method for providing cache coherency in a RAID system in which multiple RAID controllers provide read/write access to shared storage devices for multiple host computers. Each controller includes read, write and write mirror caches and the controllers and the shared storage devices are coupled to one another via common backend busses. Whenever a controller receives a write command from a host the controller writes the data to the shared devices, its write cache and the write mirror caches of the other controllers. Whenever a controller receives a read command from a host the controller attempts to return the requested data from its write mirror cache, write cache and read cache and the storage devices, in that order.

39 Claims, 6 Drawing Sheets ns and, particularly, to methods for
FULL CACHE COHERENCY ACROSS MULTIPLE RAID CONTROLLERS The present invention relates generally to methods for caching disk reads and writes in a RAID system and, particularly, to methods for maintaining the coherency of multiple caches used for caching disk reads and disk writes in a RAID system.

BACKGROUND OF THE INVENTION

FIG. 1 shows a block diagram of a typical multiple-controller RAID system 100 (RAID is an acronym for "Redundant Array of Independent Disks"). Each host computer 102 is connected to a respective RAID controller 104 through either a Fibre Channel or SCSI bus 106 via a host bus adapter (HBA). Each RAID controller 104 coordinates reading and writing requests from a respective host 102 directed to a shared set of storage devices 108 to which the RAID controllers 104 are connected via a backend Fibre Channel or SCSI disk bus 110. The controllers 104 use the same storage devices 108 so that each host computer 102 can access the same data. FIG. 1 shows only two controllers; however, the illustrated architecture is extendable to systems of N controllers (where N is an integer greater than 2). The controllers 104 have cache memories 112 in which they temporarily store the data most recently read and written by the host 102. The operation of these cache memories 112 is now described with reference to FIG. 2.

FIG. 2 shows a block diagram of the caches 112, which include a read cache 114, a write cache 116 and a write mirror cache 118. A controller 104i (where "i" represents any integer) places write data 103 (FIG. 1) from the host 102 into its write cache 116i and data 105 (FIG. 1) read from the controller 104 by the host 102 into its read cache 114i. Each write mirror cache 118i duplicates the contents 107j of another controller's write cache 116j. The write mirror cache 118i is written to by a controller 104j around the time it initiates a write operation. The write mirror caches 118 allow a duplicate copy of the write data 107 to be stored in a second controller so that a failure of either controller 104 will not result in the loss of data.

Data 107 for the write mirror caches 118 is transferred between the controllers through the backend SCSI or Fibre Channel disk busses 110. The data in a mirrored cache 118 is used only if a controller 104 involved in a write fails, in which case the mirrored data is transferred to the disks 108 for storage.

The problem with this method is that the caches may not be synchronized, which can cause the hosts to receive inconsistent data following read operations. For example, if the host controller 104-1 performs a write to a disk device 108 and the second host system 102-1 attempts to read the same data, a copy of which is already in the read cache 114-2 of the second controller 104-2, the second host would receive state data as the read caches are not updated across controllers. Further, copying all read data across the controllers would severely compromise performance. This problem will become increasingly important as clustering environments increase in popularity.

SUMMARY OF THE INVENTION

In summary, the present invention is a method to insure cache coherency across multiple RAID controllers. This invention synchronizes both the write and read caches, whereas prior art implementations only synchronize the write cache data.

In particular, the present invention synchronizes the read caches without needing to copy the read cache data between controllers. As a result, the present invention provides full cache coherency without using excessive bandwidth for inter-controller data transfers.

One embodiment of the present invention for use with multiple RAID controllers having associated read, write and mirror caches, where the controllers are connected via one or more backend channels to each other and a set of storage devices, includes the following steps:

1. In response to a command to write data to a specific address, a first controller initiates the write operation and copies the particular data to the mirror caches of one or more other controllers through the one or more backend channels.
2. The first controller then confirms that the write operation is complete.
3. In response to a command to read data at the specific address, a second controller that is one of the other controllers:
   a. checks for the data in its mirror cache and, if the data is there, returns that data to the host computer;
   b. checks for the data in its write cache, and, if the data is there, returns that data to the host;
   c. checks for the data in its read cache and, if the data is there, returns that data to the host; and
   d. if the data is not in any of the caches, gets the data from the storage devices, places the data into its read cache and returns that data to the host.

In one embodiment, the backend channels can be any combination of SCSI and/or Fibre Channel busses. In another embodiment, the storage devices are disks. In none of the embodiments is it required that a controller has a one-to-one relationship with its associated read, write and write mirror caches or with a host for which it executes read and write commands.

The present invention also encompasses RAID systems incorporating RAID controllers programmed to implement the preceding method.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
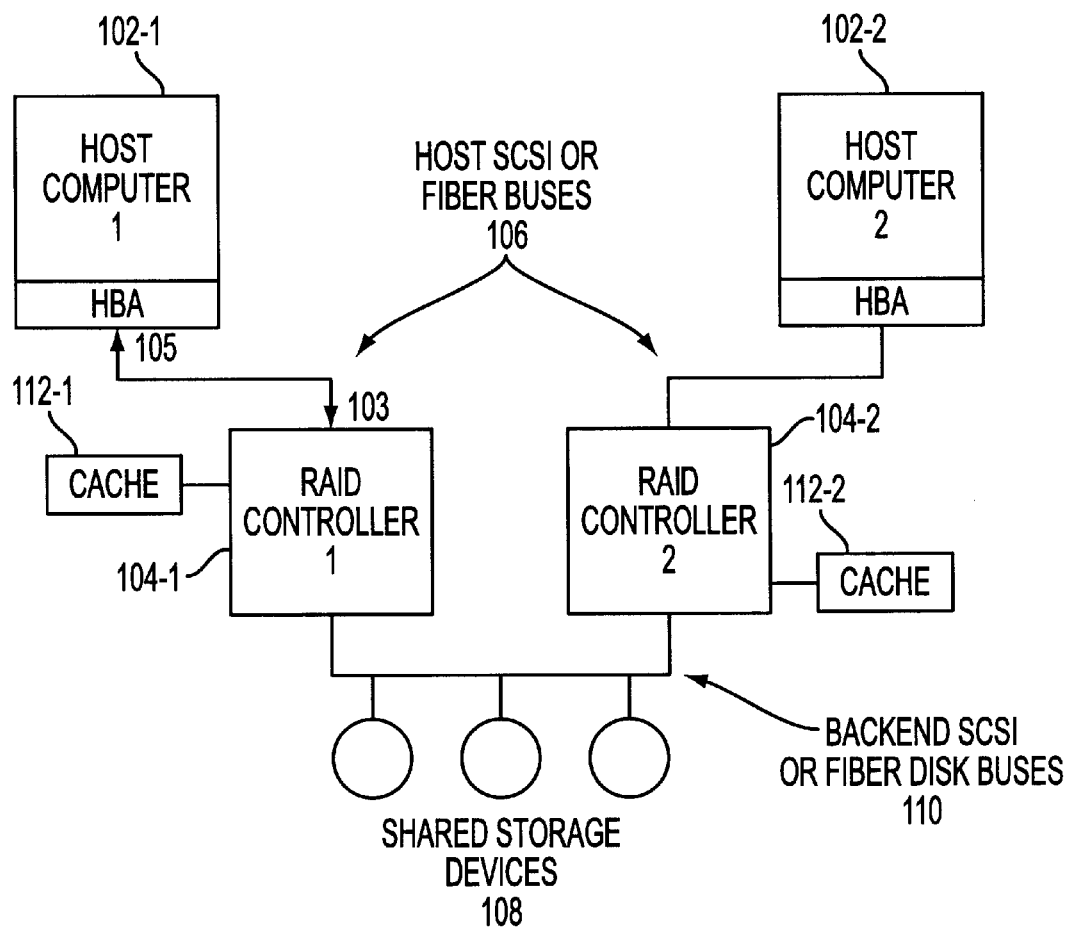
FIG. 1 shows a block diagram of a typical multiple-controller RAID system 100 (RAID is an acronym for "Redundant Array of Independent Disks")
Figure 2:
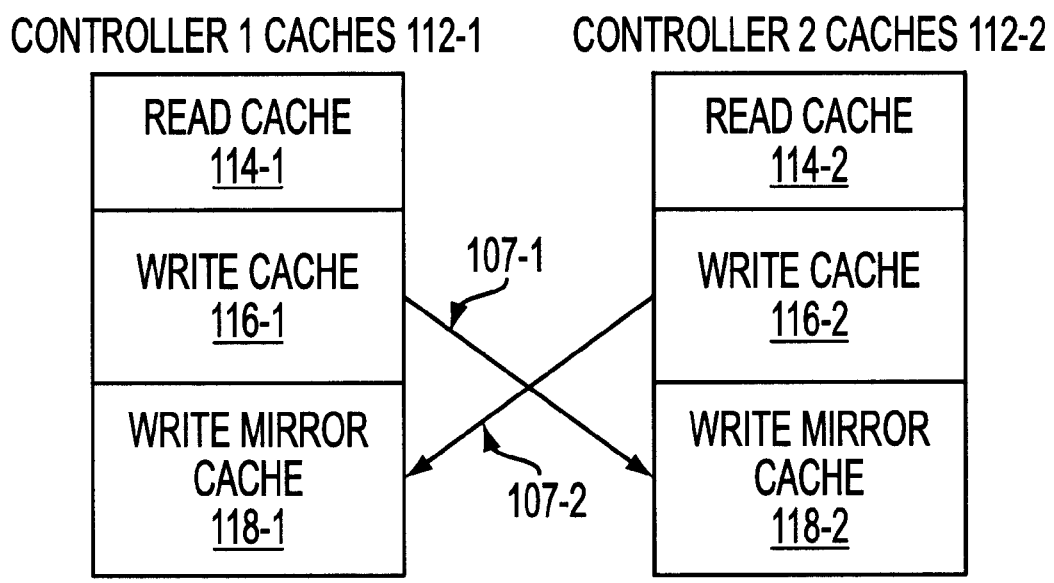
FIG. 2 shows a block diagram of the caches 112, which include a read cache 114, a write cache 116 and a write mirror cache 118.
Figure 3:
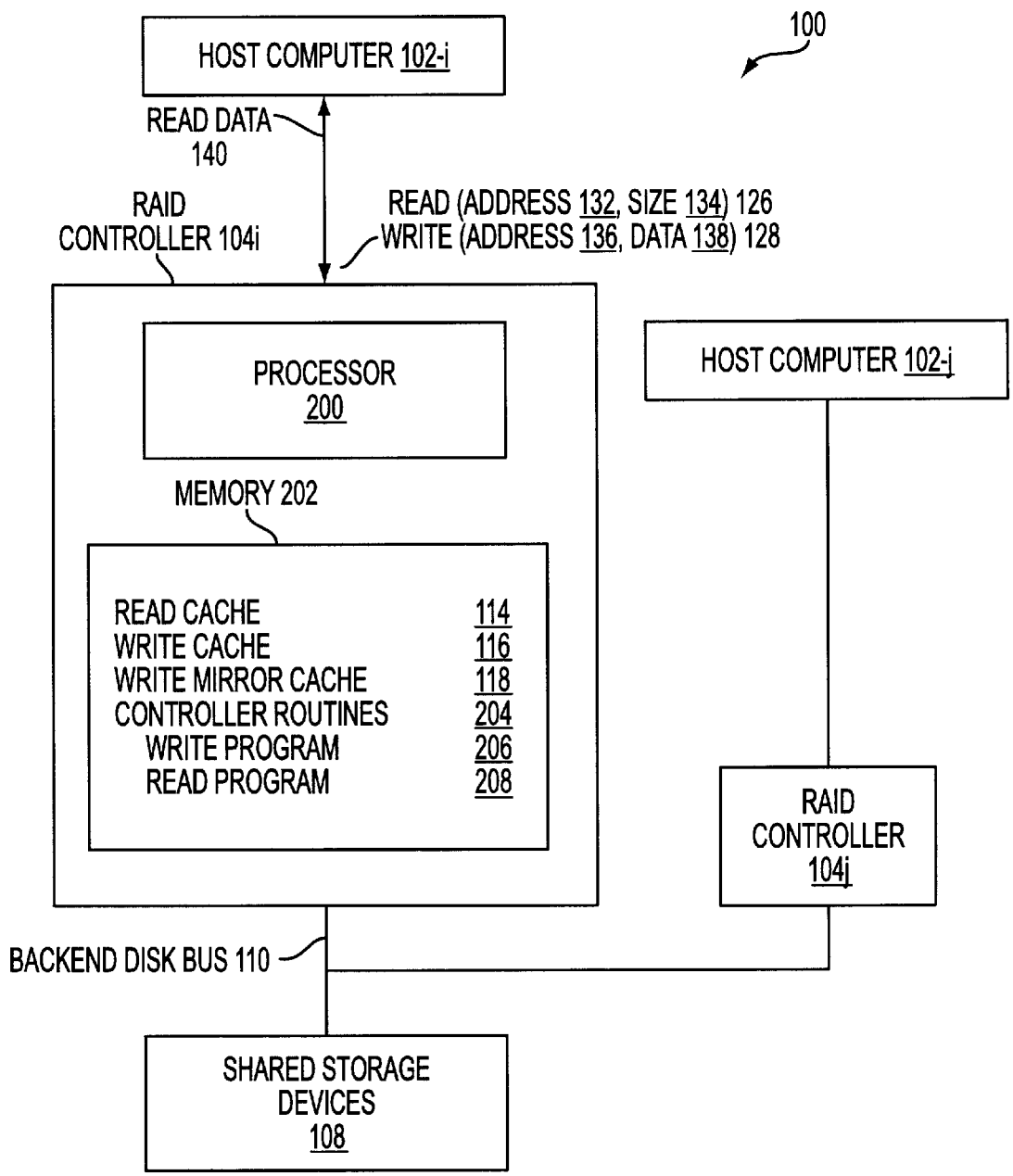
FIG. 3 shows a block diagram of a RAID controller in which the present invention is implemented.

FIG. 3 shows a block diagram of a computer system 100 in which the present invention is implemented. The computer system 100 includes many of the same components illustrated and described with reference to FIG. 1. In particular, the computer system 100 includes at least two host computers 102*i*, 102*j*, each coupled to a RAID (Redundant Arrays of Independent Disks) controller 104*i*, 104*j*. The RAID controllers 104 provide the hosts 102 with read/write access to the shared storage devices 108, which are coupled to the controllers 104 via one or more backend disk busses (referred to herein after as the backend bus) 110. In different embodiments the backend bus 110 can be a Fibre Channel bus, a SCSI bus, or another type of high-speed bus (e.g., Ethernet, EPI, HIPPI, Fire-Wire or IDE). In different embodiments the shared storage devices 108 are magnetic disk drives, magnetic tape drives, optical disks, or another type of non-volatile storage (e.g., RAMDISK drives).

Each RAID controller 104 includes a processor 200 and a memory 202. The memory 202 can be any combination of a fast memory, such as a semiconductor random access memory (RAM), a fast non-volatile memory, such as a read only memory (ROM) or an erasable read only memory EPROM, and a slow magnetic memory, such as a hard disk. The memory 202 includes a read cache 114, a write cache 116 and a write mirror cache 118 (referred to hereinafter as a "mirror cache"). The memory 202 also includes controller routines 204, which are programs that are executed by the processor 200 and determine, among other things, the operation of the controller 104 in response to read and write commands 126, 128 issued by the host computer 102. In one embodiment a read command 126 designates the address 132 and size 134 of data 140 to be read from the storage devices 108 and a write command 128 includes data 138 to be written to a particular address 136 of the storage devices 108.

The controller routines 204 include, but are not limited to, read and write programs 208, 206. In one embodiment the controller routines 204 are firmware, meaning that they are stored in non-volatile memory and therefore are available for execution as soon as the controller 104 is powered-up. The controller routines 204 can also be implemented as conventional software that is stored on a hard disk (not shown), or other non-volatile memory, and is loaded into RAM or other fast memory for execution by the processor 200 under control of an operating system (not shown). The read and write programs 208, 206, which embody principles of the present invention, are now described with reference to FIGS. 4 and 5, respectively.

Figure 4:
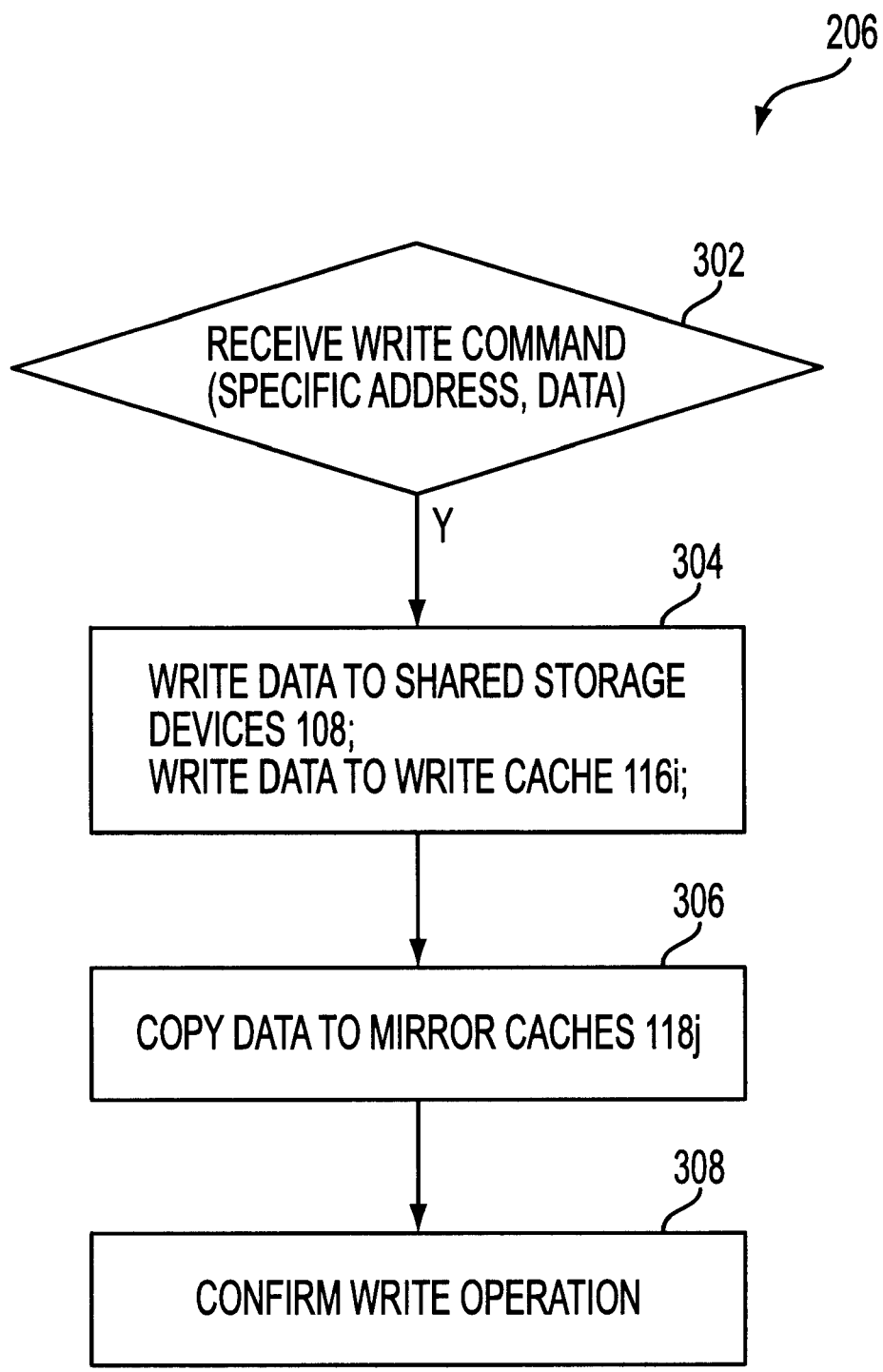
FIG. 4 shows a flow diagram of a RAID controller write method implemented in accordance with the present invention.

FIG. 4 shows a flow chart of selected steps performed by a controller 104*i* under control of the write program 206. In the conventional manner, in response to a host write command 128 (step 302) the controller 104*i* writes the designated write data 138 to the shared storage devices 108 and to its write cache 116*i* (304). In accordance with the present invention, the controller 104*i* also copies the designated data 138 to the mirror caches 118*j* of each of the other controllers 104*j* (306). The controller 104*i* accomplishes this "mirror copy" operation by broadcasting the write data 138 over the backend bus 110 using a special mirror cache write command. Finally, the controller 104*i* confirms the write operation's completion (308). If it cannot confirm completion, the controller 104*i* re-attempts the write operation using the write data 138 previously stored in the write cache 116*i*. One embodiment of the mirror copy operation 306 is now described with reference to FIG. 6.

Figure 6:
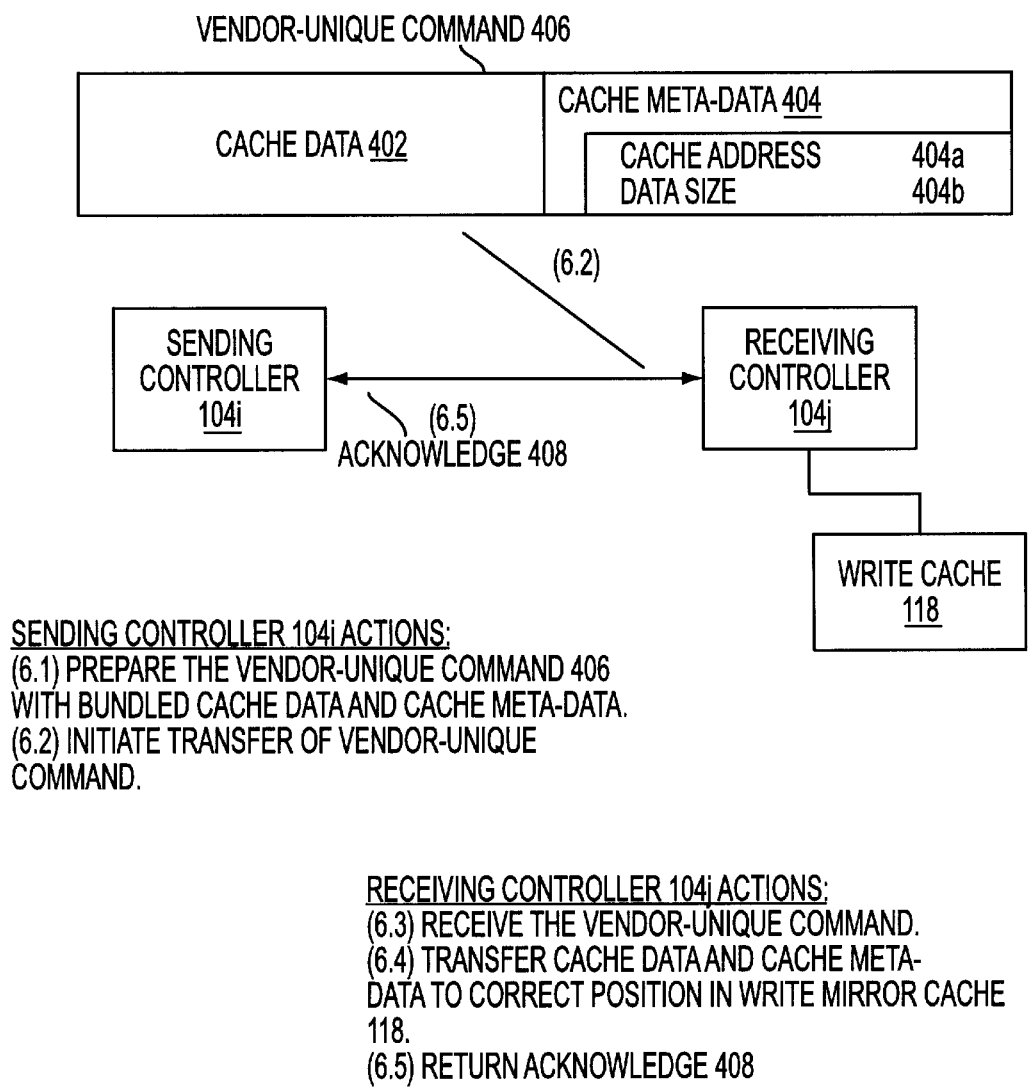
FIG. 6 shows a sequence diagram illustrating actions performed and messages exchanged by sending and receiving RAID controllers in one embodiment of a cache mirroring system.

FIG. 6 shows a sequence diagram of one embodiment of the mirror copy operation 306 that can be performed by a sending controller 104*i* and one or more receiving controllers 104*j*. This diagram shows the sequence of actions performed and messages exchanged by the controllers 104 in which the special mirror cache write command is implemented using the "Vendor-Unique" command format defined by the SCSI protocol specification. In this embodiment, the sending controller 104*i* bundles the data 402 to be cached with cache meta-data 404 (information about the address 404*a* and size 404*b* of the cache data) and imbeds this data into the data-phase of a Vendor-Unique command 406 (6.1). (Additional background information about the Vendor-Unique command may be found in the SCSI-m protocol specification, which is incorporated herein by reference: SCSI-3 Primary Commands (SPC) {Date: Mar. 23, 199, Rev. 11a, Status: Published, Project 0995-D} X3.301:1997). The sender 104*i* then initiates a transfer of the cache and meta data 402, 404 to the receiving controller 104*j* using the Vendor-Unique command 406 (6.2). The receiver 104*j*, which is configured to recognize the Vendor-Unique command 406 and to have a-priori knowledge of the structure of the data 402, 404, receives the data (6.3) and transfers that data into the correct position in the receiver's write mirror cache 118 (6.4). The receiver 104*j* then acknowledges completion of the command 406 through the usual SCSI mechanisms (6.5). Sending the command 406 to any device other than an appropriately configured controller 104 will result in an error condition for that device. In this methodology, the command 406 is sent to a single receiver as the SCSI protocol does not define a "broadcast" method. In the situation of multiple receivers, the command is sent independently to all receivers. This can occur simultaneously since multiple back-end (disk-side) channels are connected to the controllers, allowing a command to be sent to each receiver on a different back end channel.

As a result of this write method, following execution of a write command 128 a copy of the new write data 138 is resident in the mirror caches 118*j* of all controllers 104*j* that did not perform the write command 128. The mirrored data can be used by subsequent read operations initiated by the controllers 104*j*, ensuring that a read command 126 issued for the new data 138 returns the newest version 140 of that data, which is not the case with the prior art methods. The read method of the present invention, which makes this possible, is now described with reference to FIG. 5.

Figure 5:
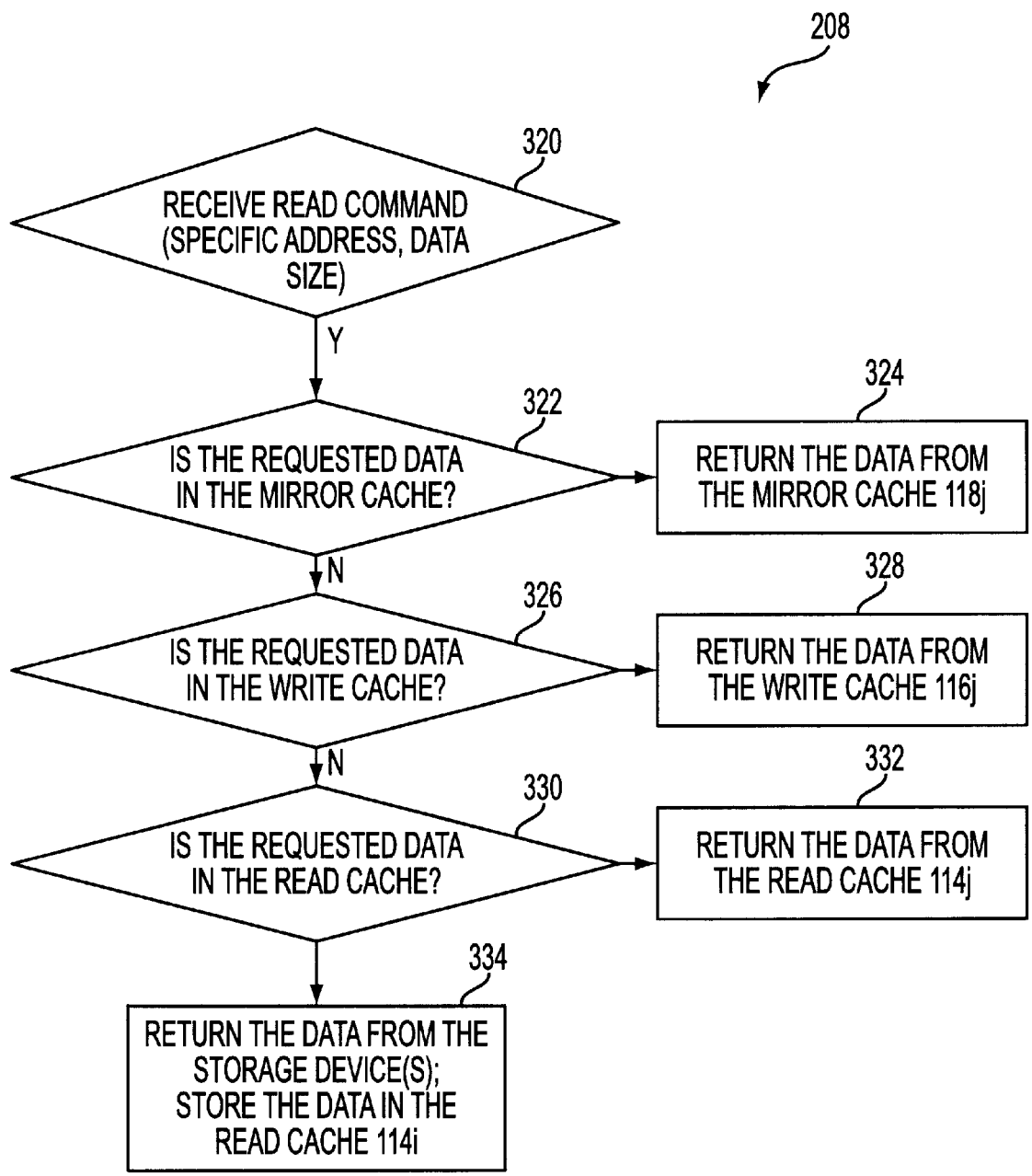
FIG. 5 shows a flow diagram of a RAID controller read method implemented in accordance with the present invention.

FIG. 5 shows a flow chart of selected steps performed by a controller 104*j* under control of the read program 208. In accordance with the present invention, a controller 104*j* carries out a host read command 126 in such a way as to ensure that it returns the current version of the requested read data to the host 102*j*. In particular, in response to the read command 126 (320), the controller 104*j* first looks in its mirror cache 118*j* for the designated read data 140 (i.e., the data at address 132 of size 134) (322). If the read data 140 is in the mirror cache 118*j* (322-Y), the controller returns that data to the host 102*j* (324). If the read data 140 is not in the mirror cache (322-N), the controller 104*j* checks its write cache 116*i* (326). If the read data 140 is in its write cache 116*j* (326-Y), the controller 104*j* returns that data to the host 102*j* (328). If the read data 140 is not in the mirror cache (322-N), the controller checks its read cache 114*i* (330). If the read data 140 is in its read cache 114*j* (330-Y), the controller 104*j* returns that data to the host 102*j* (332). If the read data 140 is not in the mirror cache (330-N), the controller returns the designated read data from the storage devices 108 (334) and stores the same data in its read cache 116*i* for subsequent use (334). (Note: generally, the controller 104 writes any data returned to the host to its read cache 114).

By checking the write mirror cache first in response to a read command, this embodiment ensures that a controller 104 returns to a host 102 the current version of the requested read data, even if previous versions of the requested data are already resident in the controller's write and/or read caches. Similarly, by requiring the controller 104 to return the requested data preferentially from its write cache 116 instead of its read cache 114 in the event the requested data is not in the mirror cache 118, this embodiment ensures that the controller 104 returns the most recent version of data it has updated. Finally, by providing for the controller 104 to supply the requested data from its read cache 114 when the other two options fail, the described embodiment ensures that data already read by the controller 104 is returned to the host 102 with minimum delay.

Thus, the present invention maintains cache coherency in a RAID system including multiple hosts and RAID controllers. In one embodiment, shown in FIG. 3, this advantage is provided without requiring additional, high bandwidth data transfers between controllers 104. This is possible because the controllers 104 not involved in a write operation simply receive the write data 138 as it is being written to the shared storage devices 108 via the backend bus.

In summary, in one embodiment for use in a RAID system having multiple RAID controllers and a set of storage devices, the host read and write processing includes:

(1) in response to a write command 128 to write first data 138 to the storage devices 108, a first controller 104$i$ writes the first data 138 to the storage devices 108 and copies the first data to mirror caches 118$j$ associated with one or more other controllers 104$j$; and (2) in response to a read command 126 to read second data 134 from the storage devices 108, a second controller 104 checks for the second data 134 in an associated one of the mirror caches and, if the data 134 is in the associated mirror cache, returns the second data to the host computer 102 that issued the read command 126.

In another alternate embodiment the first controller 104$i$ copies the first data 138 to the associated mirror caches 118$j$ by broadcasting the first data 138 to the associated mirror caches over a backend bus 110 to which the controllers 104 and the storage devices 108 are coupled. In a related embodiment the broadcasting step is implemented so that it adds no more than minimal overhead to the step of writing the first data 138 to the storage devices 108. Yet another related embodiment provides this minimal overhead by performing the broadcasting and writing steps simultaneously.

In embodiments where the RAID controllers 104 have associated read and write caches 114, 116, the host read and write processing includes the following steps in addition to the two outlined above:

(3) in response to the write command 128 to write first data 138 to the storage devices 108, the first controller 104$i$ also writes the first data to its associated write cache 116$i$;

(4) in response to the read command 126 to read second data 134 from the storage devices 108, the second controller 104:

(a) checks for the second data 134 in the associated write cache 116, and, if the data is there, returns the second data 134 to the host 102;

(b) checks for the second data 134 in the read cache 114 and, if the data is there, returns the second data 134 to the host 102; and (c) if the second data 134 is not in the associated caches 116, 118, retrieves the second data from the storage devices 108 and returns the second data 134 to the host computer 102 that issued the read command.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

For example, in none of the embodiments is it required that the controllers 104 have a one-to-one relationship with a set of associated read, write and write mirror caches 114, 116, 118 or with a host 102 for which it executes read and write commands. Additionally, it is not required that each controller 104 has a full complement of associated read, write and write mirror caches 114, 116, 118. Instead, all that is required by the present invention is that each controller 104 have an associated write mirror cache or other quickly accessed memory location into which other controllers copy host write data for subsequent, speedy retrieval by the former controller 104 in response to a host read command.

What is claimed is:

1. A synchronization method for use in a storage system having multiple active controllers each processing I/O requests and a set of storage devices, the controllers each having an associated mirror cache, an associated read cache, and an associated write cache different from said mirror cache, the method including:

in response to a write command to write first data to the storage devices, a first one of the active controllers writes the first data to the storage devices and to its own associated write cache and copies the first data to mirror caches associated with one or more other controllers that did not perform the write command; and in response to a read command to read second data from the storage devices, a second active controller checks for the data in its own associated mirror cache and, (i) if the second data is in its own associated mirror cache, returns the second data to a host computer that issued the read command; and, (ii) if the second data is found by the second active controller check not to be in its associated mirror cache, the second controller checks for and returns the second data to the host according to the following priority: first, from its own associated write cache; second, from its own associated read cache; and third from the storage devices.

2. A synchronization method for use in an RAID system having multiple active RAID controllers each processing I/O requests and a set of RAID storage devices, the RAID controllers each having an associated mirror cache, an associated read cache and an associated write cache different from said associated mirror cache, the method including:

in response to a write command to write first data to the RAID storage devices, a first one of the active RAID controllers writes the first data to the storage devices and to its own associated write cache and copies the first data to said mirror caches associated with one or more other controllers that did not perform the write command;

in response to a read command to read second data from the storage devices, a second active controller checks for the data in its own associated mirror cache and, (i) if the second data is in its own associated mirror cache, returns the second data to a host computer that issued the read command; and, (ii) if the second data is found by the second active controller check not to be in its associated mirror cache, the second controller:

checks for the second data in its associated write cache, and, if the data is there, returns the second data to the host;

checks for the second data in its associated read cache and, if the data is there, returns the second data to the host; and if the second data is not in its associated read cache, retrieves the second data from the storage devices and returns the second data to the host computer that issued the read command.

3. The synchronization method of claim 2, wherein the copying of the first data to the associated mirror caches comprises broadcasting the first data to the associated mirror caches over a backend bus to which the controllers and the storage devices are coupled.

4. The synchronization method of claim 3, wherein the broadcasting of the first data adds only the overhead associated with the first data broadcasting to the writing of the first data to the storage devices.

5. The synchronization method of claim 4, wherein the broadcasting and the writing of the first data are performed simultaneously.

6. The synchronization method of claim 3, wherein the backend bus comprises any combination of:

one or more Fibre Channel buses; or one or more SCSI buses.

7. The synchronization method of claim 2, wherein the storage devices comprise magnetic disks.

8. The synchronization method of claim 2, wherein the copying of the first data to the associated mirror caches comprises transmitting, using a SCSI Vendor Unique command, the first data to the associated mirror caches over a backend bus to which the controllers and the storage devices are coupled.

9. A cache system for use in a RAID system including a plurality of active RAID controllers each processing I/O requests and providing access to a set of RAID storage devices, said cache system comprising:

a plurality of mirror caches accessible to and associated with the controllers;

a first one of said plurality of active RAID controllers being configured, when it receives a write command to write data to a specific address, to copy the data to the mirror caches of at least one different RAID controller in addition to writing the data to the RAID storage devices;

each of the other ones of said plurality of active RAID controllers being configured, after receiving a read command to read the data at the specific address, to first check for the presence of the data in its associated mirror cache and if present to retrieve the data from its associated mirror cache before retrieving the data from the set of RAID storage devices or from any other storage means;

a plurality of write caches different from the mirror caches and accessible to the controllers, each write cache associated with a different one of the controllers;

a plurality of read caches different from the mirror caches and accessible to the controllers, each read cache associated with a different one of the controllers and controlled such that:

in response to a read command to read data at the specific address, a second controller:

first, checks for the data in its associated mirror cache and, if the data is there, returns the data to a host computer that issued the read command;

second, checks for the data in its associated write cache, and, if the data is there, returns the data to the host computer;

third, checks for the data in its associated read cache and, if the data is there, returns the data to the host computer; and fourth, if the data is not in any of the mirror, write, or read caches, retrieves the data from the storage devices and returns the retrieved data to the host computer.

10. The cache system of claim 9, wherein the plurality of controllers and the set of storage devices are connected via a backend bus.

11. The cache system of claim 10, wherein the backend bus comprises any combination of:

one or more Fibre Channel buses; or one or more SCSI buses.

12. The cache system of claim 9, wherein the first RAID controller is configured to copy the first data to the mirror caches using a SCSI Vendor Unique command transmitted over a SCSI bus to which the controllers and the storage devices are coupled.

13. The cache system of claim 12, wherein the SCSI bus comprises a storage device side backend bus.

14. The method in claim 9, wherein said first controller being configured to copy the data to the mirror caches of each of the controllers other than the one to which the write command is directed.

15. The method in claim 9, wherein said first controller being configured to copy the data to the mirror caches of all of said plurality of RAID controllers.

16. A synchronization method for use in a data storage system having at least first and second controllers which may be concurrently active to process input/output requests and at least one mass storage device; the first controller having a first controller read cache, a first controller write cache, and a first controller mirror cache different from said first controller read and write caches; the second controller having a second controller read cache, a second controller write cache, and a second controller mirror cache different from said second controller read and write caches; the method including:

in response to a write command to the first controller to write first data to the storage device, the first active controller writes the first data to the mass storage device and to the first controller write cache and copies the first data to the second controller mirror cache; and in response to a read command to the second controller to read second data from the storage device, the second active controller first checks for the second data in the second controller mirror cache and, if the data is in the second controller mirror cache, returns the second data from the second controller mirror cache to a host computer that issued the read command; and, if the second data is found by the second active controller check not to be in the second controller mirror cache, the second controller checks for and returns the second data to the host according to the following priority: first, from the second controller write cache; second, from the second controller read cache; and third from the storage device.

17. A synchronization method for use in a data storage system having at least first and second controllers which may be concurrently active to process input/output requests and at least one mass storage device, each controller having an associated read and write cache different from a mirror cache, the method including:

in response to a write command to write first data to the storage device, the first active controller writes the first data to the mass storage device and to its associated write cache and copies the first data to said mirror cache associated with the second controller that did not perform the write command; and in response to a read command to read second data from the storage device, the second active controller accesses data from its own associated mirror cache, its own associated write cache, and its own associated read cache in predefined order to ensure that a read command issued for data returns the newest version of that data, said predefined access order including:

checks for the data in its own associated mirror cache and, if the data is in its own associated mirror cache, returns the second data to a host computer that issued the read command;

checks for the second data in its own associated write cache, and, if the data is there, returns the second data to the host;

checks for the second data in its own associated read cache and, if the data is there, returns the second data to the host; and if the second data is not in its own associated mirror, write, or read caches, retrieves the second data from the mass storage device and returns the second data to the host computer that issued the read command.

18. The synchronization method of claim 17, wherein the copying of the first data to the associated mirror caches comprises broadcasting the first data to the associated mirror caches over a bus to which the controllers and the storage devices are coupled.

19. The synchronization method of claim 18, wherein the broadcasting of the first data adds substantially no overhead to the writing of the first data to the mass storage devices.

20. The synchronization method of claim 19, wherein the broadcasting and the writing of the first data are performed substantially simultaneously.

21. The synchronization method of claim 19, wherein the bus comprises any combination of: one or more Fibre Channel buses, or one or more SCSI buses.

22. The synchronization method of claim 17, wherein the mass storage devices comprise magnetic disk drives.

23. The synchronization method of claim 17, wherein the copying of the first data to the associated mirror caches comprises transmitting, using a SCSI Vendor Unique command, the first data to the associated mirror caches over a bus to which the controllers and the mass storage devices are coupled.

24. The synchronization method of claim 23, wherein the bus is a backend bus coupling the controllers and the mass storage devices.

25. The synchronization method of claim 17, wherein the mass storage devices comprise RAID storage devices.

26. The synchronization method of claim 17, wherein the mass storage devices comprise at least one magnetic disk drive organized as a RAID.

27. A computer program product for use in conjunction with a computer system, the computer program product comprising a computer readable storage medium and a computer program mechanism embedded therein, the computer program mechanism, comprising:

a program module that directs at least one of a plurality of active controllers connected to a host computer, including a first active controller and a second active controller; the first active controller having a first controller read cache, a first controller write cache, and a first controller mirror cache different from said first controller read and write caches; the second active controller having a second controller read cache, a second controller write cache, and a second controller mirror cache different from said second controller read and write caches; and one or more disk storage devices grouped into a data storage system, to function in a specified manner, the program module including instructions for directing reading and writing of data by said controllers, said instructions for reading and writing including instructions that:

direct the first active controller to write a data to the storage devices and to the first controller write cache and to copy the data to the second controller mirror cache in response to a write command to the first controller to write first data to the storage devices; and direct the second controller, in response to a read command issued to the second controller to read the data, to first check for the data in an associated one of the mirror caches and, if the data is in the second controller mirror cache, to return the data from the second controller mirror cache to a host computer that issued the read command; and, if the data is found by the second controller check not to be in the second controller mirror cache, the second controller checks for and returns the data to the requesting host according to the following priority: first, from the second controller write cache; second, from the second controller read cache; and third from the storage device.

28. A computer program product for use in conjunction with a computer system, the computer program product comprising a computer readable storage medium and a computer program mechanism embedded therein, the computer program mechanism, comprising:

a program module that directs at least one of a plurality of active controllers connected to a host computer, and one or more disk storage devices grouped into a data storage system, to function in a specified manner, the program module including instructions for:

writing, by a first one of the active controllers, first data to the storage devices and copying the first data to mirror caches associated with one or more other active controllers in response to a write command to write first data to the storage devices; and checking, by a second controller, for second data in an associated one of the mirror caches and, if the second data is in the associated mirror cache, returning the second data to a host computer that issued the read command in response to a read command to read second data from the storage devices;

directing the first controller to also write the first data to its associated write cache different from said mirror cache in response to the write command to write first data to the storage devices;

directing the second controller, in response to the read command, to read second data from the storage devices including:

checking for the second data in its own associated write cache, and, if the data is there, returning the second data to the host;

checking for the second data in its own associated read cache different from said write cache and mirror cache and, if the data is there, returning the second data to the host; and if the second data is not in its own associated mirror, write, or read caches, retrieving the second data from the storage devices and returning the second data to the host computer that issued the read command.

29. A method for maintaining storage system cache coherency across a plurality of concurrently active storage system controllers coupled to a host computer, said controllers being of the type having both a read cache, a write cache, and a write mirror cache, said method characterized in that:

said method maintains synchronization of data in both said read caches and said write caches by mirroring write data in said write mirror cache and by ordered accessing of data previously written to said read, write, and mirrored write caches to ensure that a read command issued by a host computer for a data returns the newest version of the data, said ordered accessing comprising in response to the read command issued to a particular one of said controllers:

first, checking for the data in its own associated mirror cache and, if the data is in its own associated mirror cache, returning the data to a host;

second, checking for the data in its own associated write cache, and, if the data is there, returning the data to the host;

third, checking for the data in its own associated read cache different from said write cache and mirror cache and, if the data is there, returning the data to the host; and fourth, if the data is not in its own associated mirror, write, or read caches, retrieving the data from the storage devices and returning the data to the host computer that issued the read command.

30. The method in claim 29, further characterized in that said read caches are synchronized by said ordered accessing of data stored in the read cache, write cache, and mirrored write cache without explicitly copying read cache data between said storage system controllers.

31. The method in claim 30, further characterized in that full cache coherency of said read caches and said write caches is achieved without requiring additional inter-controller data transfers beyond those required for writing the data to the shared storage devices by having the controllers not involved in a write operation receive the write data as a broadcast as it is being written to the shared storage devices over a backend bus such that communication bandwidth associated with synchronization is substantially unchanged relative to a configuration not providing synchronization.

32. The method in claim 31, wherein said particular controller, in response to receiving a write data command, writes the designated write data to its own associated write cache and places said write data on the backend bus so that the designated write data is also written to said storage system and to the mirror cache of at least one other one of said controllers over the backend bus.

33. The method in claim 32, wherein said at least one other one of said controllers comprise all of said plurality of controllers.

34. The method in claim 33, wherein when any one of said controllers performs a read operation, said controller checks its write mirror cache buffer for a copy of the requested data before checking said storage system or any other cache, thereby insuring that the most current version of the data to be read is obtained.

35. The method in claim 32, wherein said storage system comprises at least one redundant array of independent disks (RAID) and said storage system controllers comprise RAID controllers.

36. The method in claim 29, wherein said storage system comprises at least one redundant array of independent disks (RAID) and said storage system controllers comprise RAID controllers.

37. A controller for use in a multi-controller disk drive based storage system, said storage system having a plurality of said controllers and a plurality of mass storage devices, each said controller comprising:

a processor;

a memory coupled to said processor;

at least one communications bus for coupling with other ones of said plurality of controllers and said plurality of storage devices;

an associated mirror cache, an associated read cache and an associated write cache different from said mirror cache;

means for maintaining data coherency and synchronization among said plurality of controllers, including:

means for writing by a first one of said plurality of controllers, in response to a write command to write first data to the storage devices, the first data to the storage devices and copying the first data to mirror caches associated with one or more other ones of said plurality of controllers that did not perform the write command;

means for checking by a second one of said plurality of controllers, in response to a read command to read second data from the storage devices, for the second data in its own associated mirror cache and, if the second data is in its own associated mirror cache, for returning the second data to a host computer that issued the read command;

means for writing by the first controller, in response to the write command to write first data to the storage devices, the first data to its own associated write cache; and means for checking by said second controller, in response to the read command to read second data from the storage devices, when the second data is found by the check not to be in its associated mirror cache, for the second data in its associated write cache, and, if the data is there, for returning the second data to the host; and for checking for the second data in its associated read cache and, if the data is there, returning the second data to the host; and if the second data is not in its associated read cache, retrieving the second data from the storage devices and returning the second data to the host computer that issued the read command.

38. The controller of claim 37, wherein the mass storage devices comprise at least one magnetic disk drive organized as a RAID.

39. The controller of claim 37, wherein said mass storage devices are selected from the group of devices consisting of: magnetic disc drives, magnetic tape drives, optical disks, non-volatile storage devices, and combinations thereof.

* * * * *